United States Patent [19]

Gipson

[11] Patent Number: 5,778,402
[45] Date of Patent: Jul. 7, 1998

[54] METHOD AND SYSTEM FOR AUTO-FORMATTING A DOCUMENT USING AN EVENT-BASED RULE ENGINE TO FORMAT A DOCUMENT AS THE USER TYPES

[75] Inventor: Dale L. Gipson, Redmond, Wash.

[73] Assignee: Microsoft Corporation, Redmond, Wash.

[21] Appl. No.: 482,194

[22] Filed: Jun. 7, 1995

[51] Int. Cl.$^6$ .................................................. G06F 7/00
[52] U.S. Cl. ........................ 707/530; 707/523; 707/531
[58] Field of Search ................................. 395/792, 793, 395/796, 797, 801, 802, 803, 785, 2.6, 2.62, 2.63, 50, 51, 54, 63

[56] References Cited

U.S. PATENT DOCUMENTS

| | | | |
|---|---|---|---|
| 4,797,855 | 1/1989 | Duncan, IV et al. | 395/795 |
| 4,847,766 | 7/1989 | MaRae et al. | 364/419.17 |
| 4,914,704 | 4/1990 | Cole et al. | 395/2.44 |
| 4,969,097 | 11/1990 | Levin | 364/419.15 |
| 5,091,878 | 2/1992 | Nagasawa et al. | 364/419.14 |
| 5,251,292 | 10/1993 | Martel, Jr. et al. | 395/150 |
| 5,317,647 | 5/1994 | Pagallo | 382/161 |
| 5,377,309 | 12/1994 | Sonobe et al. | 395/76 |
| 5,390,281 | 2/1995 | Luciw et al. | 395/12 |
| 5,452,206 | 9/1995 | Turrietta et al. | 364/419.17 |
| 5,469,538 | 11/1995 | Razdow | 395/140 |
| 5,479,563 | 12/1995 | Yamaguchi | 395/2.41 |
| 5,479,596 | 12/1995 | Capps et al. | 395/148 |
| 5,484,214 | 1/1996 | Ueda et al. | 400/63 |
| 5,546,538 | 8/1996 | Cobbley et al. | 395/200.01 |
| 5,621,875 | 4/1997 | Mason et al. | 395/793 |

OTHER PUBLICATIONS

*A Comparitive Evaluation of Expert System Tools*, William Mettrey, 1991 IEEE Computer Magazine, vol. 24, Issue 2, Feb. 1991.

*Primary Examiner*—Heather R. Herndon
*Assistant Examiner*—Stephen Hong
*Attorney, Agent, or Firm*—Klarquist Sparkman Campbell Leigh & Whinston LLP

[57] ABSTRACT

A method for interactively formatting a document uses event-based rules to trigger auto-formatting actions as the user types. An event monitor intercepts user input events such as the typing of characters on the keyboard to detect predefined events. In response to these predefined events, a rule-based event engine schedules rules dependent on the events in event interval sections of a rule base. The event engine evaluates rules scheduled in an event interface section of the rule base when an event interval occurs. When a rule is evaluated, further rules can be scheduled for evaluation in the same event interval section or other interval sections. A special type of rule, called an action rule, can generate autoformat actions when it is evaluated. When an action rule is evaluated and is satisfied, the event engine places the action or actions associated with the action rule in a queue. The event monitor then invokes actions in the queue to automatically format the document as the user types.

16 Claims, 10 Drawing Sheets

METHOD AND SYSTEM FOR AUTO-FORMATTING A DOCUMENT USING AN EVENT-BASED RULE ENGINE TO FORMAT A DOCUMENT AS THE USER TYPES

FIELD OF THE INVENTION

The invention generally relates to document processing and more specifically, relates to a method for formatting text in a document.

BACKGROUND OF THE INVENTION

Today's word processing software enables even inexperienced users to prepare sophisticated documents. Word processors typically include a number of features that allow the user to format a document by defining the style, layout, or character font(s) of a document. Using these features, the user can create a variety of documents such as reports, letters, memos, etc. having different layouts, fonts, styles, etc.

Ironically, the proliferation of new formatting features have made word processors more difficult to use. Users now have so many options to format a document that it is very difficult to keep track of them. To define the format of a document, the user has to either remember the command or commands to define a format, or has to select from a number of options in the user interface for the word processor. Even with the most helpful user interfaces, formatting a document can be cumbersome and time consuming.

If a user does select a formatting feature, the behavior of the word processor sometimes becomes even more confusing. For example, if a user selects a chart option, the level of complexity for entering text increases. The user often has to learn new commands to enter text in the chart. These commands can vary in each word processor and are not intuitive to the average user.

For most users, the easiest way to prepare a document is to simply enter text as if typing on a typewriter. The average user often relies upon his/her familiarity with the keys on a typewriter to prepare a document using a word processor. For example, to create an outline, a typical user manually enters the numerals and letters and indents the various sections using the tab key. Many users still prepare an outline in this fashion even though they can usually select an outline feature and have the word processor automatically generate an outline format. This reluctance to take advantage of word processor capabilities applies to a number of other formatting features as well. Thus, while word processors are designed to help users create more professional documents, they still feel more comfortable entering text as if using a normal typewriter.

Formatting features are not helpful enough because they do not complement the way most users use the word processor. Users either do not want to take the time to learn how to select formatting features, or are not comfortable using them. Accordingly, there is a need for a word processor that alleviates the burdens of formatting a document, but at the same time, still provides a wide range of formatting options.

SUMMARY OF THE INVENTION

To address the problems associated with existing word processing systems, the invention provides an interactive autoformatter to simplify and improve word processing. The interactive autoformatter enables a word processor to automatically format a document as the user types.

According to one embodiment, the interactive autoformatter monitors user input as the user types, and automatically formats the document according to a number of autoformat rules. The autoformatter reads characters as the user types them via a keyboard. It then analyzes the characters to identify predefined events.

The predefined events are arguments to autoformat rules. If an event occurs, then affected rules are evaluated. The interactive autoformatter generates autoformat actions if a rule is satisfied and then automatically performs these actions as the user types.

The formatting in this system is "interactive" in the sense that it occurs while the user is editing a document. The user does not have to separately invoke formatting commands or a batch formatter. As such, the user does not have to remember how to invoke formatting features, and does not even have to pause to select formal commands. The user simply has to know how to enter text as if typing on a typewriter, and the interactive formatter will automatically format the document as the user types.

Further advantages and features of the invention will become apparent with reference to the following detailed description and accompanying drawings.

DETAILED DESCRIPTION

The following description begins by explaining the elements of a computer system in which a method and system according to one embodiment of the invention is implemented. The description then provides an overview of the components of an interactive autoformatter according to an embodiment of the invention. Next, the description provides additional detail explaining the operation of the embodiment and how to implement it.

Figure 1:
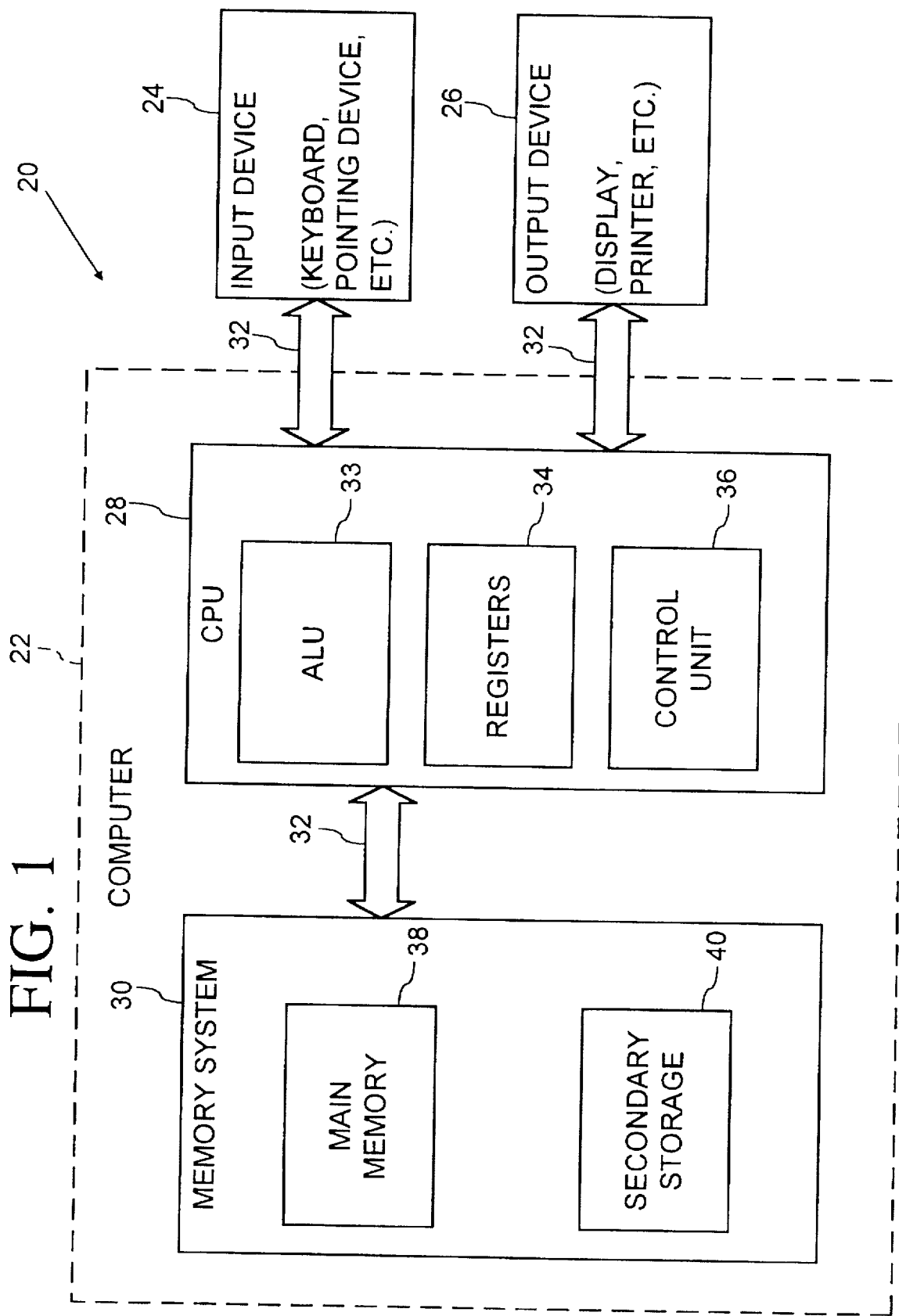
FIG. 1 is a block diagram illustrating the architecture of a computer system used to implement an embodiment of the invention.

FIG. 1 is a block diagram of a computer system 20 which is used to implement a method and system embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical, magnetic or other recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, modem, printer, sound device or other device for providing output data from the computer.

It should be understood that FIG. 1 is a block diagram illustrating the basic elements of a computer system; the FIG. 1 is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. As another example, the invention may be implemented in an Apple Macintosh computer from Apple Computer. The Macintosh computer system is based on the MC68000 family of processors from Motorola Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

An operating system, loaded into memory of the computer system, provides a number of low level functions to support the operation of an embodiment of the invention. In general, the operating system is responsible for controlling the allocation and usage of a hardware resources such as memory, CPU time, disk space, and peripheral devices. As is well-known, operating systems provide such low level functions as module (process and dynamic link library) management, scheduling, interprocess messaging, memory management, file system management, and graphical user interface support.

A number of well-known operating systems are available for the computers listed above. For instance, the Microsoft DOS and Windows operating systems are widely used for computer systems based on the X86 family of processors from Intel Corporation. As another example, the Windows NT operating system can be used with computer systems based on the X86 family of Intel processors as well as RISC machines. As yet another example, the UNIX operating system and variations of it are widely used on a variety of computer systems.

Though the invention can be implemented using variety of different operating systems, the embodiment to be described is implemented in a computer system installed with a Windows operating system from Microsoft. The embodiment takes advantage of the Windows Application Programming Interface (Win32 API) from Microsoft Corporation to support a graphical windowing environment. A description of the Windows API is available from Microsoft Corporation in the Windows 95 Software Developers' Kit (SDK), as well as in a variety of reference books, such as "Microsoft Win32 Programmers Reference" published by Microsoft Press.

Figure 2:
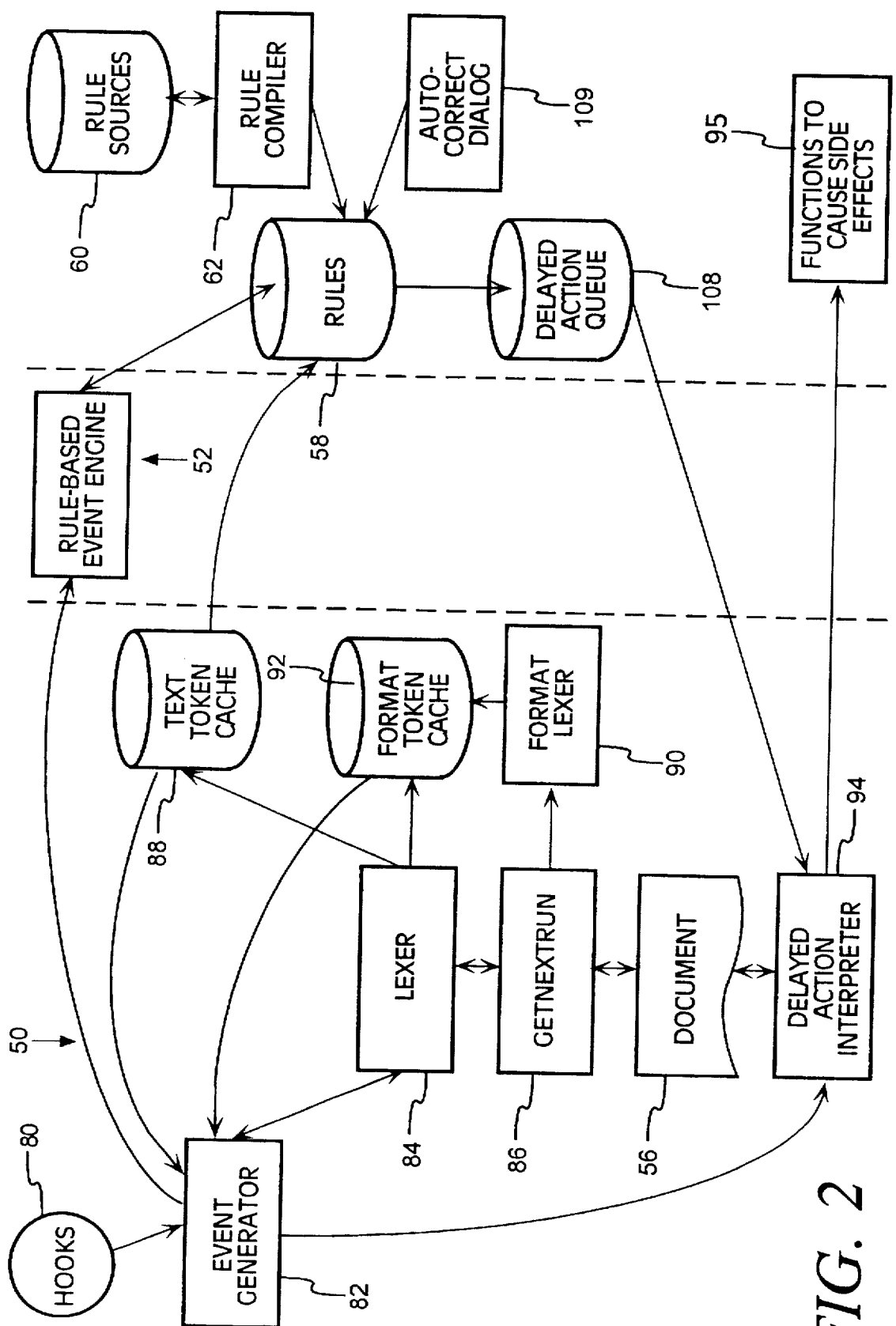
FIG. 2 is a block diagram of the architecture of an autoformatter according to an embodiment of the invention.

Having described the hardware and operating system context used to implement an embodiment, the description now sets forth the architecture of the embodiment. FIG. 2 illustrates the architecture of an interactive autoformatting system. The system can be explained in terms of three primary components: the event monitor 50, rules-based event engine 52, and the rule-base 58. The system is explained in terms of this general structure to clarify understanding of the invention. Those of skill in the art will recognize that this structure could vary without departing from the scope of the invention.

Turning to the left side of FIG. 2, the event monitor 50 is a portion of the system responsible for monitoring input as the user types or otherwise creates other input, and for initiating functions to automatically format a document 56. The event monitor 50 captures user input and generates events from this input. The event monitor 50 then passes these events to the rule-based event engine 52.

By passing events to the event engine 52, the event monitor causes events and rules to be scheduled for evaluation. The event monitor 50 calls the rule-based event engine 52 to evaluate the rules and events scheduled in an interval section of the rule-base 58. As a result of this evaluation, the event engine 52 can cause delayed actions to be generated to carry out an autoformat rule. If any autoformat rules apply, the event monitor 50 is responsible for issuing calls to the appropriate functions to carry out these delayed actions.

Before continuing, it is important to clarify terms relating to rules in this implementation. A "pseudo code rule" refers to a high level rule that describes the conditions for an autoformat action in human terms. To implement these pseudo code rules in a computer, they are written in a high level source code such as C and placed in rules sources 60. The rules in the rule sources 60 are then compiled to form the rule-base 58. The rules in rule sources 60 have a one to one correspondence to the rules in the rule-base 58. Accordingly, the general term, "rule," applies to both the rule sources 60 and the rules in the rule-base 60. The structure of the rule-base 58 is detailed further below.

Referring again to FIG. 2, the rules-based event engine (event engine) 52 is a portion of the system that evaluates the user input according to rules in the rule-base 58.

The event engine 52 includes two routines to process events: a scheduling routine and an evaluate routine. When the event monitor 50 passes an event to the event engine 52, the event engine determines which rules and other events depend on the event, and it schedules them for evaluation. The event engine evaluates these scheduled rules and events when the event monitor calls the evaluate routine. The scheduling and evaluating steps are interrelated because the evaluation of rules can, and often does, cause additional events and rules to be scheduled. For example, if a rule is satisfied, it causes rules dependent on it to be scheduled for evaluation either directly or through new events.

While the evaluation of rules can cause other rules and events to be scheduled, the scheduling and evaluate routines are separate. Rules and events can be scheduled either by the event monitor 50 as described above, or by the event engine 52 during evaluation. The rule-base 58 is divided into interval sections defined below. In general, rules are evaluated when the event monitor calls the evaluate routine to evaluate rules and events scheduled in a specific interval section of the rule-base. During evaluation, the evaluate routine calls the scheduling routine whenever evaluated events or rules schedule additional events or rules. The process of scheduling and evaluating of rules and events in an interval section continues until no more rules are scheduled for evaluation within that interval section.

The event monitor calls the evaluate routine for an "interval section" in response to identifying an "event interval."

The rule-base is divided into interval sections, each corresponding to an event type. An interval section is dedicated to processing common types of events. When an event is generated from user input or from the evaluation of another rule or event, it is scheduled in its interval section.

An "event interval" defines when the evaluate routine is called to evaluate the rules and events scheduled for a particular interval section. An event interval, therefore, corresponds to an interval section.

To explain the concept of an event interval, it is helpful to describe it in terms of the user input. The event monitor is looking for state changes of each event type. Since there are a variety of event types, each corresponding to an interval section, the event monitor watches for state changes for each event type. When the event monitor identifies a state change (i.e. event interval) for a particular event type, it triggers the evaluation of the corresponding interval section.

Interval events can be analogized to time. A tick of the second hand represents a new second interval. The passing of the minute hand to the next minute represents the arrival of a new minute interval. The passing of the hour hand to the next hour represents the arrival of another hour interval. In this system, the event intervals represent a state change of a different quantity than time, but the concept is similar. Here, the event interval represents a state change for a particular event type. When this state change occurs, the event monitor calls the evaluate routine for the corresponding interval section.

In this implementation, there are several event interval sections. There are interval sections for a variety of events including user interface, selection, dialog, character, token, line, paragraph, object and document events. The selection interval section tracks "selection" events (e.g. when the user selects text or moves the cursor). The dialog interval section tracks user input events inside dialog boxes or menus. The user interface interval section tracks higher level events than the dialog interval section and includes such events as actuation of a push button control, invoking a dialog, etc. The objects interval section tracks events for multiple paragraph entities, tables, etc. The document interval section tracks events that are valid until the document changes. For example, a header is considered a separate document, so when a user opens a header, this can cause a document event in the document event interval section.

The token interval section keeps track of certain characters or character strings that form logical units such as delimiters and words.

The number of interval sections can vary. To keep track of a variety of user input, the number of events that the event monitor watches for can be increased, and the number of event interval sections to classify these events can also be increased. For autoformatting rules, the primary interval sections of concern are character, token, line, paragraph, object, and document. The event monitor also watches for other types of events mainly to make sure that events that could interfere with autoformatting rules do not occur. If a rule depends on a certain sequence of a word and character, it can also be important to include in the rule a condition that certain other user input events do not occur between the word and character. For instance assume the user types a word, causes other events at the user interface or dialog interval sections, and then finally returns to type the character. In this example, the desired conditions that the user only type a word and then a character are no longer satisfied. In sum, the rules can depend on the occurrence of events as well as the absence of other events.

By separating events into these event interval sections, the underlying event engine can control when rules are evaluated. Events and rules in other interval sections can be scheduled by events and rules in the current interval section. This is significant in the context of word processing because it is one way to delay the evaluation of a rule based on certain types of user input. The use of interval sections enables the rule-base to represent when rules should be evaluated in terms of what the user does. For example, a user can type a string of characters that generates an event interval for the token interval section. When this event is propagated through the rule-base in the token interval section, the event engine can schedule rules at a higher interval section, such as the paragraph interval section. This capability can result in significant efficiency because a rule need only be evaluated if scheduled and if an event interval occurs for the interval section where the rule resides in the rule-base. As such, the design of the rule-base reduces the amount of processing required to determine whether rules are satisfied. The ability to schedule rules in other event intervals or interval sections can also allow for rules to anticipate a user action that may occur at a very long time later.

Turning now to the right side of FIG. 2, the rule-base 58 is a portion of the system responsible for implementing the rules. The rule sources 60 are rules written in a high level language, such as C, and then compiled into the rule-base 58 using the rule compiler 62.

The rules are expressed in terms of a number of events that must occur before an action is taken such as scheduling one or more additional events or rules, or executing code. These events are expressed in terms of variables, and the conditions of a rule are logical expressions using these variables as arguments. The rule can, for example, specify part of a sequence of events that must occur using logical connectors. The rule can also define a number of conditions in terms of logical operators including "and," "not," and "or," as well as check global state within the document or word processor, or call functions.

One example of a high level autoformat feature is where the system deduces that the user is creating a bulleted list, and then automatically formats the document. Not knowing how to invoke a format feature, a typical user may use an asterisk. For example, the user may create a list by typing an "*" as the first character of a paragraph, followed by a space and then followed by a word. A pseudo code rule to automatically format these characters would be: if a line begins with an "*" followed by a white space, followed by a word, then change the asterisk to a bullet and invoke auto-bullet mode. In source code, this abstract rule is written in terms of a series of sequence rules.

Figure 3:
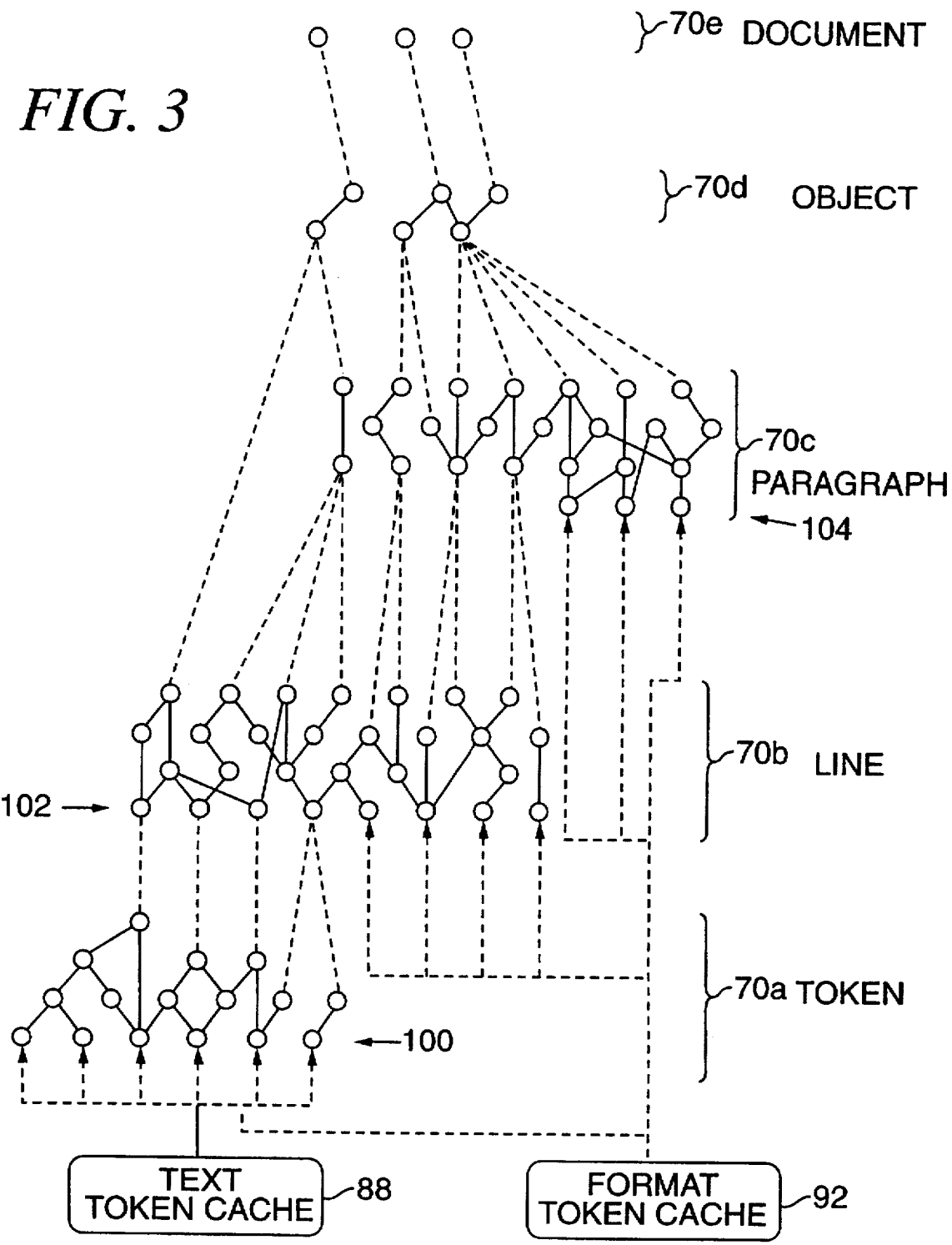
FIG. 3 is a diagram illustrating an example of the structure of a rule-base.

When compiled with the rules compiler 62, the rules are sorted into a network of nodes. Each event and rule is represented by a node in the rule-base. FIG. 3 illustrates an example of the structure of this network. The network includes a number of nodes, arranged in several interval sections 70a–e. Each interval section corresponds to an event interval. In turn, each event interval section can have a number of levels to reflect inter-dependencies among events and rules in an interval section.

Nodes at one level can have a linkage with nodes at the next higher level, or with nodes several levels above. In addition, there can be linkage between nodes in one interval section and nodes in a higher or different interval section.

FIG. 3 graphically illustrates the relationship among nodes in the rule-base. Each node can depend on many events. Many of the nodes are inter-dependent because they depend on the same events or rules. To represent this dependency among events and rules, the rule compiler 62 converts each rule and event into a node and sorts the nodes into levels. A rule node could be "If event1 occurs, then event2." Rules that depend on other rules or events reside at a higher or different level than the rules or events that they depend on. Within a section, nodes that depend on another node reside at a higher level then nodes they depend on.

The linkage between the nodes represents the dependencies between the nodes. Linkage can be direct when in the same interval, indirect via an event, or delayed by scheduling for evaluation in another interval. In the case of a rule, the linkage represents a relationship between a rule and nodes that depend on it. An example of a direct rule is "if event1 occurs, then schedule event2." An example two indirect, interdependent rules is, "if event1 occurs, then set event2 to true," and, "if event2 occurs, then set event3 to true." The second rule depends on the first because the first rule can change the value of event2. And an example of a delayed rule is "if event1 occurs, then schedule event2 after a delay of one interval."

The network structure as illustrated in FIG. 3 helps explain how rules are scheduled and evaluated with the event engine 52. As noted above, when an event occurs in an event interval, the event triggers a iterative process of scheduling and evaluating nodes. In FIG. 3, an event interval corresponds to an interval section 70a–e in the network. When an event occurs for an interval section, the event engine 52 schedules affected nodes, and then evaluates the nodes one level at a time beginning with the first level of the interval section.

The event engine 52 repeatedly evaluates and schedules nodes until all nodes scheduled for a level have been evaluated. Then the event engine moves to the next level and evaluates nodes scheduled at that level. The event engine continues this process for all levels in the interval section and then stops. During this process, nodes at other interval sections can be scheduled as reflected by the linkage among nodes in different interval sections in FIG. 3. However, these nodes are not evaluated until the event monitor calls the evaluate routine for that interval section.

In the context of this network, there are a number of different types of rules including a primary rule, a secondary rule, a sequence rule, and an action rule. A primary rule is a rule that does not depend on any other rule. The event engine 52 automatically schedules a primary rule when the event(s) that it depends on changes value. A secondary rule depends on another rule or rules. A secondary rule is explicitly scheduled by another rule. In other words, the evaluation of a rule can cause a secondary rule to be scheduled.

A sequence rule is a type of secondary rule that enables an autoformat action to be dependent on a sequence of events. The sequence rule allows the event engine to detect a sequence of events because it delays evaluation of parts of a composite rule to a later event interval where a later event can be detected. A sequence rule is scheduled with a delay such that it is not evaluated until a specified number of event interval changes occur. For example, if an event in a sequence causes a rule to evaluate in one token interval, the rule can schedule a sequence rule to be evaluated in the next token interval. The two rules behave as a composite rule with the ability to detect patterns in a sequence. By structuring a composite rule in this manner, the event engine can detect whether two token events occur in a sequence.

The sequence rule is a way to delay evaluation of rules in the rule-base. The other way, outlined above, is where a rule causes another rule to be scheduled in a higher or different interval section 70b–e in the network. In both cases, the event engine delays evaluation by evaluating a rule in a different event interval.

An action rule is a rule that can generate a delayed action. If the action rule is satisfied, then it places a delayed action in a delayed action queue. This delayed action can be a single action or a composite action including a number of actions to be performed. For example, in creating a bulleted list, there can be a number of actions associated with editing the document to create the list and additional actions such as displaying help text to the user. To initiate these delayed actions, the event monitor removes them from the queue, one at a time, and calls the appropriate functions to carry them out.

Having described the event monitor 50, event engine 52, and rule-base 58 generally, I now describe the implementation of these components in more detail.

As shown in FIG. 2, the event monitor 50 includes a number of functional elements including: event hooks 80 for capturing user input, several event generators 82 for generating events for the various interval sections from the user input, and a lexer 84 for identifying events in terms of "tokens". In addition to these elements, the event monitor includes the GetNextRun function 86 for accessing a run of uniformly formatted text from a line format buffer. From this text, the lexer is responsible for identifying "text tokens" and storing them in the text token cache 88 as shown. From the run of text, the format lexer 90 identifies "format tokens," and temporarily stores them in the format token cache 92. The delayed action interpreter 94 initiates functions 95 to format the document based on delayed actions generated during evaluation of action rules in the event engine. Each of these functional elements are described in further detail below.

A hook 80 is a call from a procedure in the word processor to an event generator that intercepts user input, such as keystrokes on the keyboard, and passes this user input to an event generator. The event hooks are added as needed to support new events specified in the rules. Since events are based on need, the number and type of event hooks can vary. The word processor program includes a number of hooks, located in various sections of the code to trap a variety of user input events. One example of a hook is the character event hook used to intercept keystrokes as they are received in the system. The word processor can also include other hooks to intercept other forms of input to the user interface of the system. For instance, this embodiment also includes hooks to detect text selection, user interface events such as a mouse click on a push button, and dialog events from user input inside a dialog box.

An event hook can be located in a variety of locations in the word processor depending on how the word processor is implemented and which inputs are to be intercepted. In this embodiment, the hooks for user interface events are located in code sections that call a routine for dispatching commands called "command dispatch." Since command dispatch also processes macros, which do not correspond directly with user input at the keyboard or mouse, the hooks are located at higher code layers where user input can be distinguished from a macro. A macro is essentially a script, potentially including a number of commands executed in response to one or more user input actions. As such, commands included in the script do not map directly to user input actions. Since the rules in the rule base are concerned with certain types of user input, the hooks must be placed in code sections where the desired user input events can be detected. However, the location and implementation of the hooks can vary.

Like the hooks for user interface events, the hooks for dialog events are specifically designed to intercept certain types of user input events. In this embodiment, there are two ways to intercept user input events in a dialog box: 1) by comparing a "before" and "after" state of the dialog box; and 2) by adding a hook to a centralized procedure responsible for processing all dialog boxes in the word processor. In the first approach, an event hook calls the event generator to capture the state of the dialog during initialization of the dialog, and then a second event hook calls the event generator which compares this state with the state of the dialog when the dialog terminates. Events that only depend on final user changes to a dialog box are conducive to the first approach. In the second approach, an event hook in the code for processing dialog boxes intercepts user input as it occurs such as checking or unchecking check boxes, clicking on pushbuttons, etc. and calls its event generator to generate events. These events need to be added when rules need to know specific sequence of user input events in a dialog box.

The hook for selection events behaves similarly. This hook is designed to detect when the user selects and un-selects text.

Each event generator 82 is responsible for generating events from the user input and passing these events to the event engine 52. In general, event generators can be implemented as separate routines or can be combined into a single routine. Conceptually though, the event specific generators can be viewed as a single event generator. In this embodiment, the event generator 82 includes a event generators for user interface, dialog, character, selection, and token events.

Figure 4:
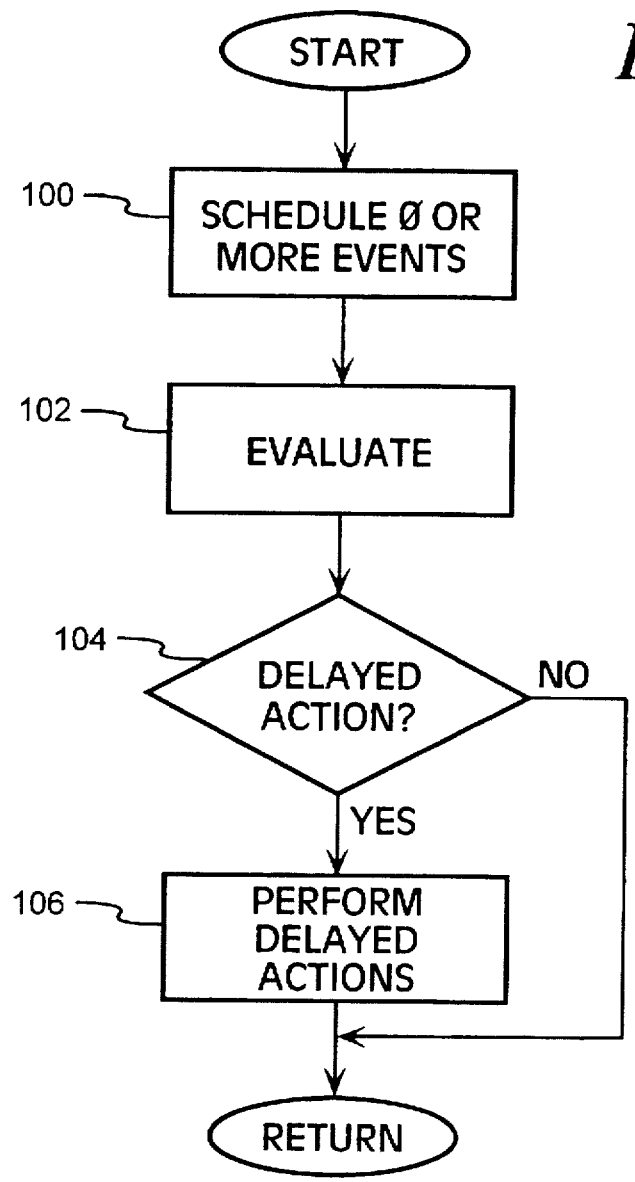
FIG. 4 is a flow diagram providing an overview of an event generator according to an embodiment of the invention.

FIG. 4 is a flow diagram providing an overview of an event generator. An event generator runs in response to events intercepted from a respective event hook. The first step 100 of the event generator is to identify any relevant events and schedule them. The event generator filters events that relate to the rule-base from the events obtained from the hooks. Generally, an event generator uses a table to look-up events that relate to the rule base. However, some events include more than a look-up table as will be explained further below. While this embodiment identifies relevant events using a table, alternative methods can be used.

In general, the table can map a user input event to one or more events that relate to the rule-base. Each event in the table is associated with an index into the rule-base to support scheduling of events. The first step 100 refers to scheduling zero or more events because it is possible that events from an event hook can generate no relevant events or a number of relevant events.

In the next step 102, the event generator calls the evaluate routine of the event engine to evaluate rules and events for an interval section. For example, the user interface event generator calls the evaluate routine for the user interface interval section in response to a user interface event interval; the character event generator calls the evaluate routine for the character interval section in response to a character event interval; and so on. To keep track of the number of events, the event engine increments a counter for an interval each time an event generator calls the evaluate routine for its respective interval section. The evaluate routine can also evaluate another interval section if in the evaluation for an interval section, a rule triggers a transition to this other interval section. For example, this is how the token generator triggers the evaluation routine for the line, paragraph, object, and document intervals.

Decision step 104 reflects that the event generator determines whether any delayed actions need to be carried out after the evaluation step 102. If so, the event generator calls the delayed action interpreter 94 to perform the delayed actions as depicted generally in step 106. In this embodiment, each of the event generators generally execute according to the steps in FIG. 4. However the specific design can vary as will become apparent from the following description of the character and token event generators.

Figure 5:
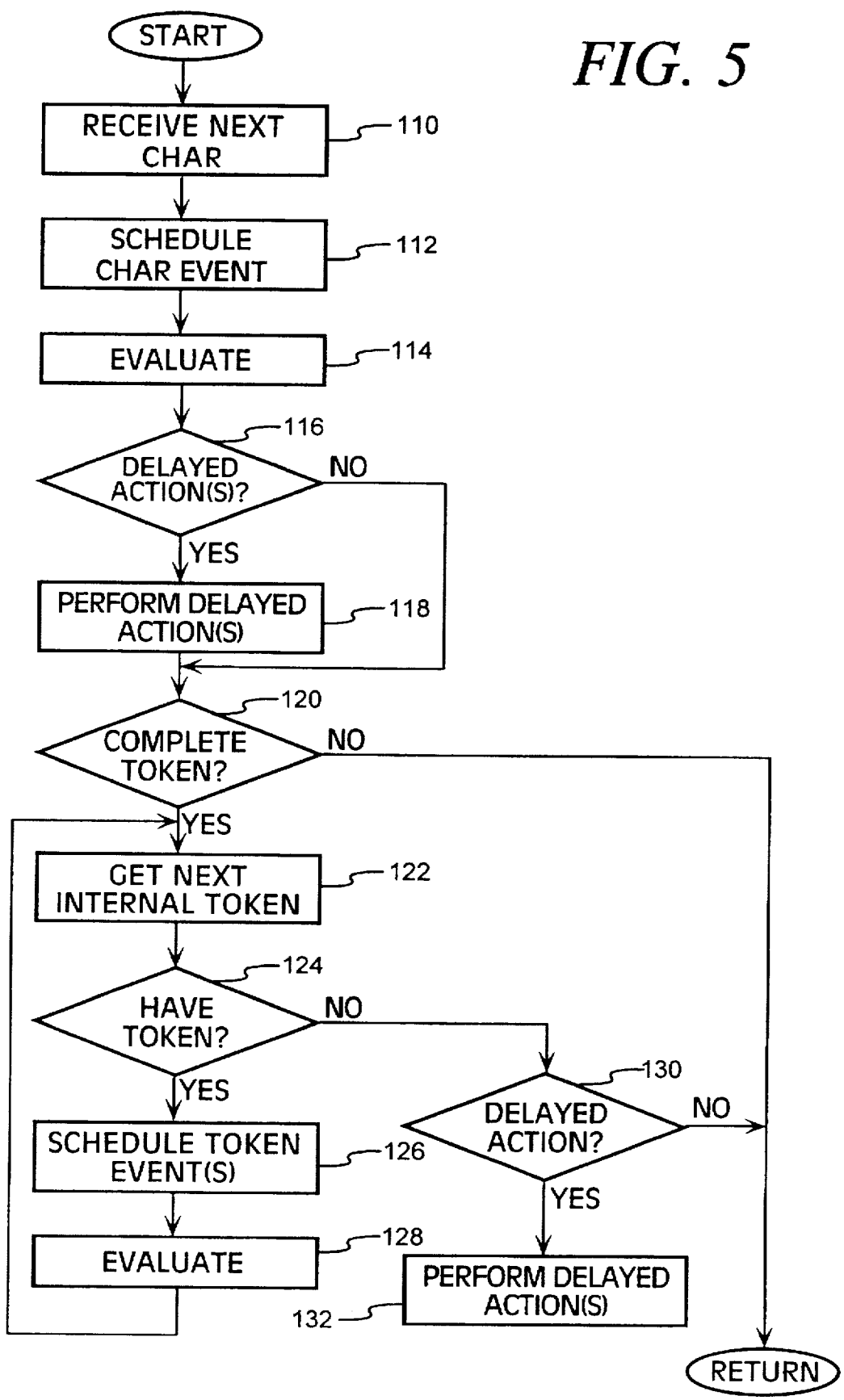
FIG. 5 is a flow diagram illustrating steps performed by a character and token event generator in an embodiment of the invention.

FIG. 5 provides an overview of the steps performed by the character and token event generators. In this embodiment, the character and token event generators are implemented in a single routine to optimize performance. Both the character and token event generators can generate events in response to the user typing a single character.

The process begins when the character event hook calls the character event generator when the user types a character. In a first step 110, the character event generator receives a character from the character hook 80. By looking the character up in a look-up table, the character event generator identifies a character event, if any, for each character passed from the character hook.

In the next step 112, the character event generator schedules a character event. In scheduling a character event, the character event generator calls the scheduling routine in the event engine, and passes an index for the character event into the rule-base in the character interval section. The character event generator monitors character events to watch for patterns in the document. For instance, a sequence rule may depend on a word, followed by a white space, and then followed by an alphanumeric character. In this example, the composite sequence rule can be written in terms of a token event for a word and character events for a white space character and an alphanumeric character.

The character event generator then calls the evaluate routine for the character interval as shown in step 114. If any delayed actions are produced during evaluation, they are placed in a delayed action queue. The character event generator determines whether there are any delayed actions to perform by checking the queue (116). If so, the character event generator calls the delayed action interpreter 94 to perform the delayed actions as reflected in step 118.

Steps 110 through 118 summarize the behavior of the character event generator. Each character typed can potentially result in formation of a token. As such, once the character event generator processes any character events, the token event generator processes any token related events. Steps 120-132 relate to the token event generator.

The token event generator is responsible for generating events in terms of tokens. As explained previously, the rules in the rule-base 58 depend on both events and other rules. The token provides a way to establish a relationship between user input, comprising characters and strings of characters, to events represented in the rule-base 58. The token event generator calls the lexer to identify a "token" event. When the lexer 84 identifies a "token," it has determined that a certain type of event has occurred that impacts the rule-base.

There are two types of tokens in this implementation: a text token and a format token. The text token represents a character or string of characters. These text tokens are important to the rule base because they represent whole words or delimiters. Each has a one to one relationship with corresponding event in the rule-base. FIG. 3 shows how text tokens relate to the compiled rule base at the token interval section 70a by depicting text tokens linked to nodes by a series of arrows emanating from the text token cache. When the event generator 82 passes a text token to the event engine 52, it is informing it which event has occurred so that related rules or events can be scheduled and evaluated.

Format tokens correspond to a type of format applied to the text and can span several text tokens. FIG. 3 also illustrates how format tokens relate to the compiled rulebase 58. Like text tokens, format tokens correspond to rule-base event nodes. Format tokens can correspond to events at the token interval section, and also the line interval, and paragraph interval sections as shown by the dashed lines emanating from the format token cache 92.

Each token passed to the event engine is associated with an index, character position data, and a value. The token's index specifies a node in the rule-base 58. When the event generator passes a token to the event engine 52, it provides an index to an event node in the rule-base. The event node is associated with a dependents list of rules and other event nodes to be scheduled.

The character position data includes the starting character position of the token in the line format buffer and in the document file. It also includes the range of effect, or length of the token in both. Character position data for both the line format buffer and the document is included because the character positions can be different due to such things as created text, display fields etc. that appear in the line format buffer but not in the document, or hidden text, which is text that appears in the document but not the line format buffer.

The value passed with the token is the value of the event associated with it. As described above, an event is represented by a variable node in the rule-base. For text tokens, the value of its variable is either 1 or zero, where 1 indicates that the event generator has detected the event. For format tokens, the value is non-zero or zero. The value can be non-zero because it represents useful information in formatting. For example, the value of a format token corresponding to "indent" represents the amount of horizontal space for the indent. Where the value is zero for formatting purposes, yet the event is detected, the value can be temporarily forced to a non-zero value and then back to indicate to the event engine that the event has occurred.

It is important not confuse the concept of a token with the token interval. A token can represent events at the different interval sections starting with the token interval and ranging up to the document interval section. Text and format tokens represent types of events identified from user input. An event interval, on the other hand, is a unit of state change as described above, and the "token interval" is just one type of event interval in this embodiment. What constitutes a unit of change is a design decision and can vary. The token interval corresponds to the token interval section 70a in FIG. 3. In the example of FIG. 3, text tokens and some format tokens are indexed into nodes in the rule-base at the token interval section as shown by the arrows leading from the text and format token caches to the first level 100 in the token interval section 70a. In addition, other format tokens are indexed to the line and paragraph interval sections as shown by the arrows leading into nodes at the first level 102 of the line interval section 70b and the first level 104 of the paragraph interval section 70c as well.

As stated generally in decision step 120, the token generator determines as an initial inquiry whether a character or sequence of characters constitutes a complete token. This initial inquiry as is an optimization. It avoids unnecessary processing by first determining whether a complete token exists. To implement this optimization, the token generator uses a degenerative version of the lexer. The token generator identifies whether a character or string of characters constitutes a token by using a character translation table and a state machine table. The character translation table classifies the type of character. The state machine table takes the result from the character translation table, and identifies transitions in the types of characters to determine whether a character or string of characters constitutes a token.

Figure 6:
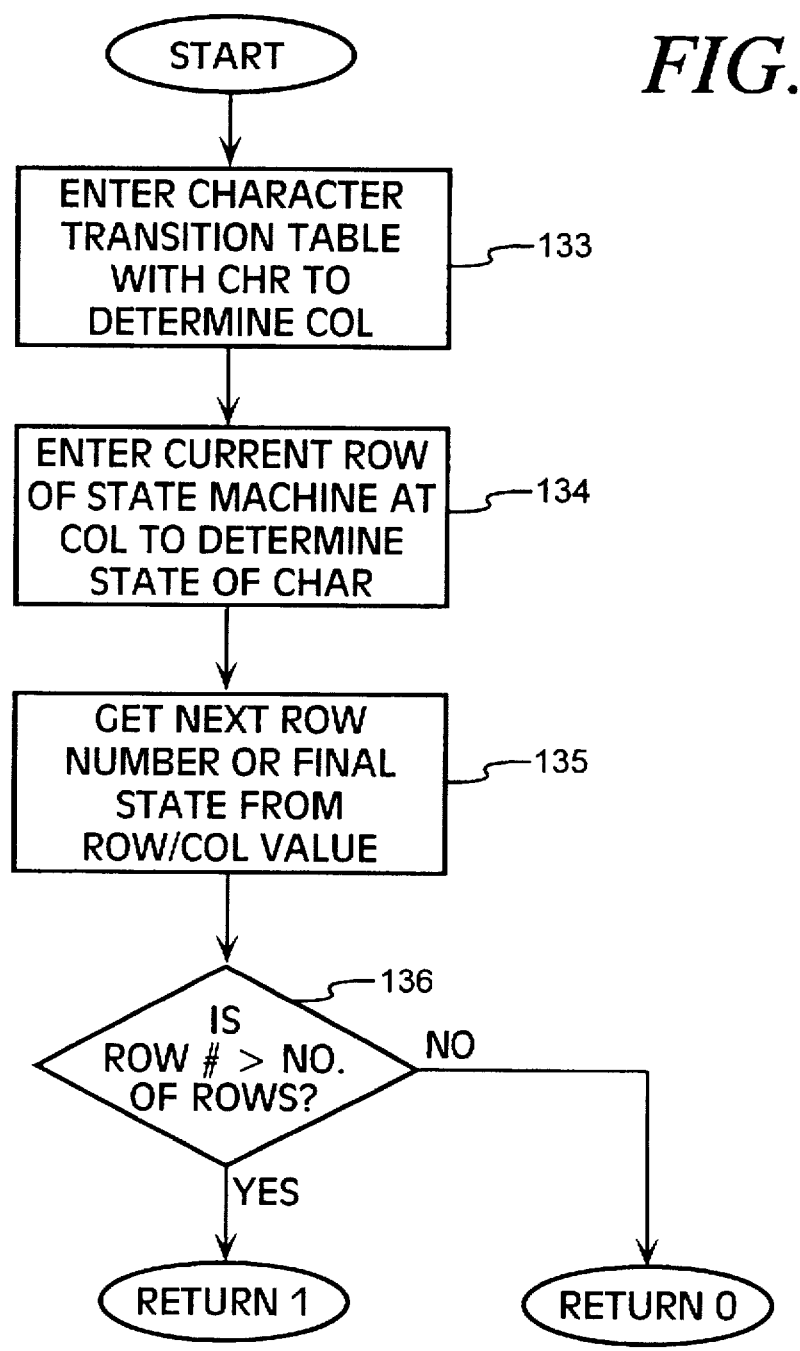
FIG. 6 is a flow diagram illustrating the steps of the steps performed in detecting a complete token according to an embodiment of the invention.

FIG. 6 is a flow diagram, illustrating how the degenerative lexer identifies a complete token.

In step 133, the degenerative lexer enters a character translation table with the character fetched from the current run of text that is being processed. The character translation table returns a column number in the state machine table. Though the state machine table can be implemented without the character translation table, the use of a separate character translation table is preferred because it reduces the size of the state machine required and allows it to handle special character sets (e.g. Russian, ANSI, IBM). It should be appreciated by those of ordinary skill in the art that other techniques can be used for keeping track of changes in state and of the type of text element being processed.

The degenerative lexer initially enters the state machine at row zero and at the column indicated by the character translation table. Each row represents a different state of the lexer. At the intersection of each row and column, there is a new state value which is the next state of the lexer after processing the current character. If the next state is less than the total number of rows, the state value represents the next row to be used for the next character. If the value is greater than the number of rows, it represents the preliminary token type for the token. After the first character the degenerative lexer enters the state machine at the current row and at the column returned by the character translation table, as indicated in step 134. As each character is typed, the process continues until the new state exceeds the number of rows. At this point the state value is the preliminary token type value of the token. The preferred embodiment uses a finite state machine table with four rows, row 0 being the row used as the initial point of entry, row 1 corresponding to blanks or whitespaces, row 2 corresponding to alpha characters, row 3 corresponding to numbers.

The columns for the state machine table range between 0 and 11 in the preferred embodiment, with column 0 corresponding to blanks and whitespaces, column 1 corresponding to alphanumeric characters A–Z, column 2 corresponding to numeric characters 0–9, and the remaining columns corresponding to other types of characters such as punctuation marks, symbols, etc.

If the first character in a run of text is an alpha character, the character translation table indicates column 1 of the state machine. The value at column 1 at row 0 in the state machine indicates a new state, row 2, as the new state of the lexer. As subsequent alpha characters of the alpha token are scanned, the character translation table will continue to point to the same column, and the new state at the intersection of column 1 and row 2 will remain in the state of row 2, which processes alpha characters. If, for example, a punctuation symbol, such as a comma, is passed from the event hook, the character translation table will point to the column used for that type of punctuation symbol, and the new state at that column will be outside of row 2 because it is not an alpha.

In a decision step 136, the degenerative lexer determines if the new row number from step 135 is greater than the total number of rows of the state machine, and if so, it has detected that the character or string constitutes a complete token. Since the state machine table identifies changes in state, the degenerative lexer can determine when a word of text has been processed and can identify the next character as a comma, period, colon, or some other type of punctuation, that should be treated differently than the previous characters of a word.

After step 136, the degenerative lexer has determined whether the character or character string constitutes a complete token. If so, processing then continues with step 122 in FIG. 5.

If the degenerative lexer identifies a complete token (120 and FIG. 6), then the token generator 82 calls the full lexer 84 to identify the specific text token or format tokens associated with it. The token event generator calls the lexer 84 to generate token interval events for a specified range of characters. In calling the lexer, the token event generator specifies a range of characters for which it is to return tokens.

The lexer 84 is responsible for identifying tokens from the characters scanned from the document. The lexer 84 accesses a line format buffer storing a line of characters scanned from the document. By calling the GetNextRun function 86, the lexer 84 receives pointers to a run of uniformly formatted text in the line buffer.

The lexer 84 identifies text tokens and places them in a text token cache 88, a data store for temporarily storing text tokens. To determine whether a character or string of characters constitutes a text token, the lexer 84 uses the character translation table and state machine table described above in connection with the degenerative lexer.

Figure 7A:
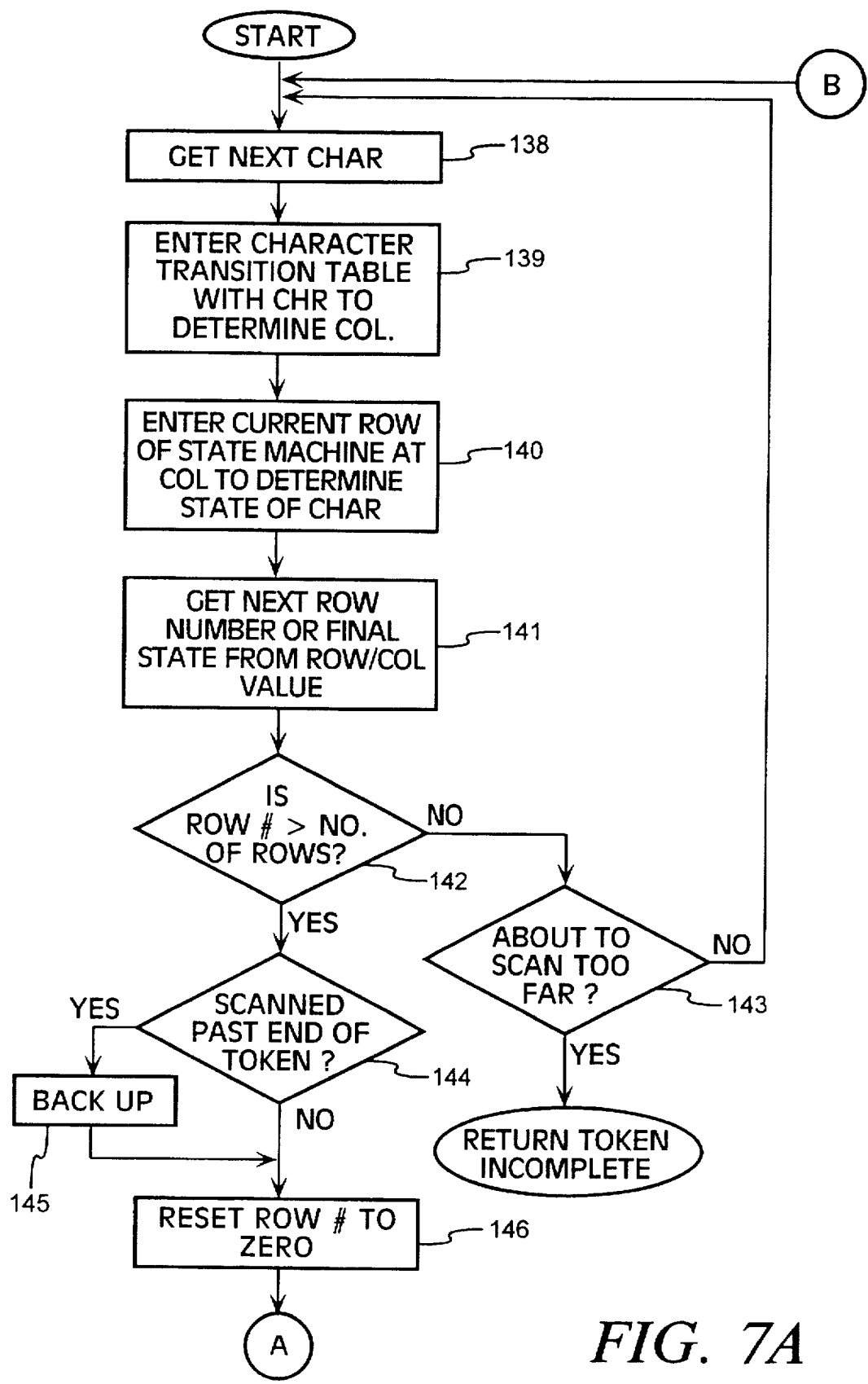
FIGS. 7A and 7B are a flow diagram illustrating steps performed in identifying a text token according to an embodiment of the invention.
Figure 7B:
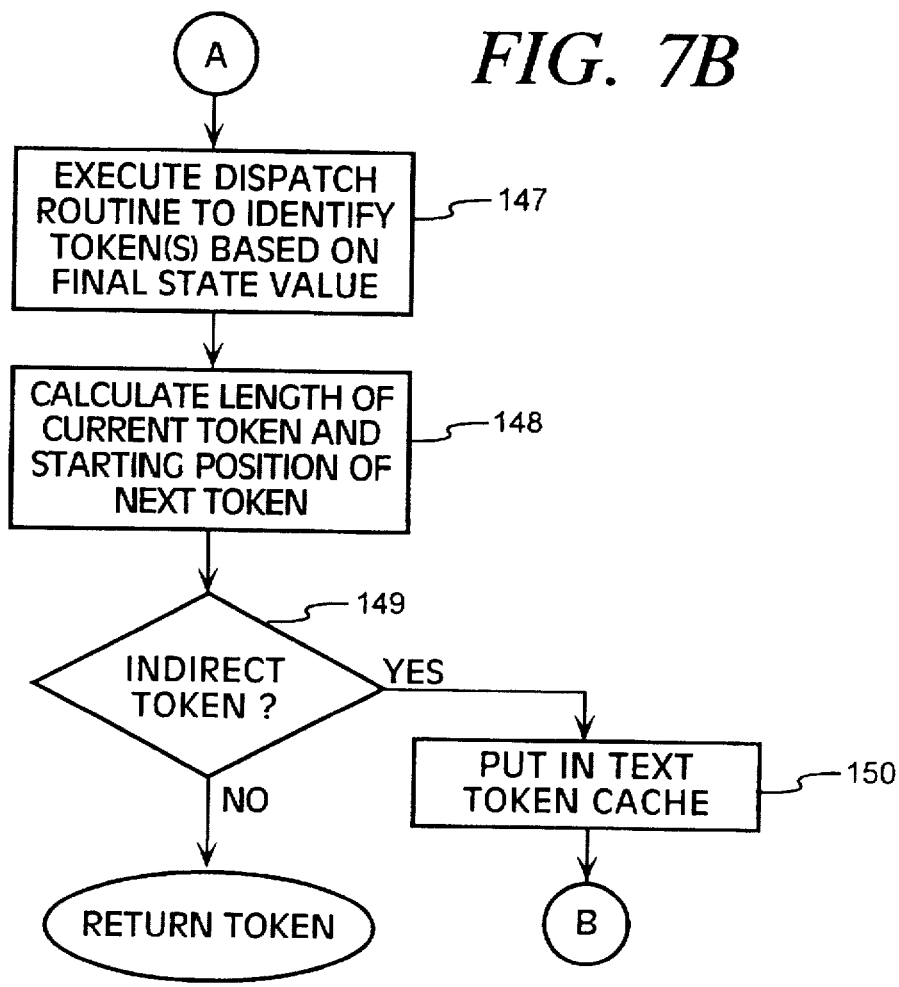

FIGS. 7A and 7B illustrate a flow diagram of the steps performed by the lexer. The lexer scans characters from the line format buffer, and updates the state machine table similar to the degenerative lexer. Step 138 refers to how the lexer gets the next character from the line format buffer. In this step, if there are no characters to scan in the run the lexer calls GetNextRun to fetch another run and resets the pointers. Steps 139–142 are the same as steps 133–136, performed by the degenerative lexer. The lexer executes the same states in the state machine table as the degenerative lexer, and is capable of resuming where the degenerative lexer stops.

If the current row number does not exceed the number of rows in the state machine table, then the lexer determines whether it is about to scan too far before getting the next character. This simply means that the lexer checks whether it is about to scan beyond the character range specified by the token event generator. One example is when the lexer is scanning to the insertion point. If the next character is beyond the insertion point, the lexer then returns "token incomplete."

Referring again to decision step 142, if the current row number does exceed the number of rows in the state machine table, then the lexer proceeds to decision step 144. In identifying a token, the lexer can scan past the last character of the token. If this occurs, the lexer backs up the appropriate number of characters as illustrated in step 145. The final state of the state machine table indicates the preliminary type of token. At this point, the lexer has the preliminary token type (e.g. alpha, numeric, delimiter), and the number of characters to back up (one or zero characters). The lexer then resets the row number to zero as shown in step 146.

Referring now to FIG. 7B, the lexer calls the dispatch routine to identify one or more tokens based on the preliminary token type (i.e. final state value from the state machine table).

For some tokens such as alpha and numeric strings, the method of identifying the specific token includes using a look-up table to identify a token. The rule compiler 62 generates this look-up table when compiling the rule sources 60. For alpha strings the dispatch routine checks for capitalization and can generate a format token indicating: "starts with caps," "has caps," or "all caps." Thus, though the lexer primarily identifies text tokens, it can also identify some format tokens and place them in the format token cache.

For others tokens additional processing is required. For special characters such as paragraph marks the lexer must analyze the token in terms of its position.

After the dispatch routine returns, the lexer then proceeds to step 148 and calculates the length of the current token and the starting position of the next token.

Whether the token corresponds to a token interval event depends on its type. In this implementation, "indirect" tokens do not correspond to token interval events. Indirect tokens are characters such as whitespaces, annotation marks, and footnote marks. Instead of returning these indirect tokens immediately, the lexer caches them in the text token cache as illustrated in step 150. "Direct" tokens correspond to interval events and are returned to the event generator. In general, direct tokens are alpha or numeric strings, or delimiters such as punctuation.

Figure 8:
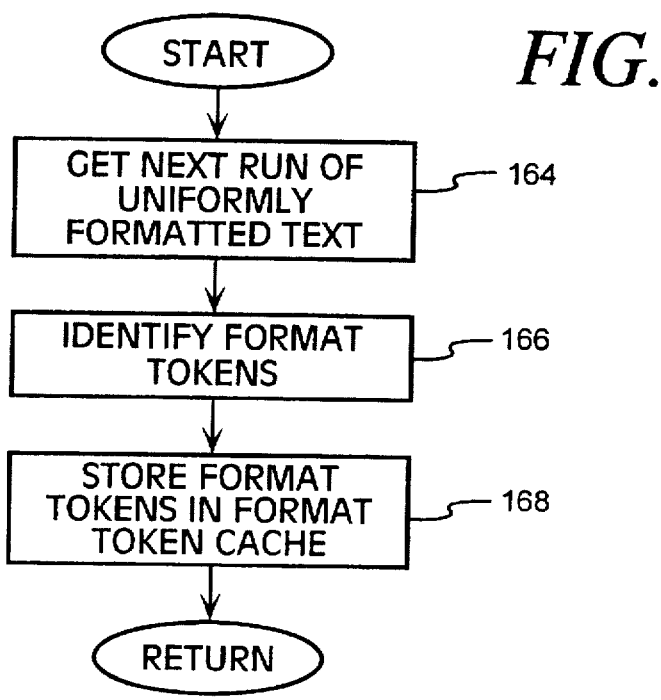
FIG. 8 is a flow diagram illustrating the steps performed in identifying format tokens according to an embodiment of the invention.

The format lexer 90 is used to identify format tokens, which represent one or more characters having the same formatting. The format lexer 90 is invoked for each new run of text returned by the GetNextRun function 86. FIG. 8 illustrates the process of identifying format tokens in more detail. The format lexer 90 identifies format tokens from the run of uniformly formatted text. When the lexer 84 calls the GetNextRun function 86 because it needs more characters to scan, it returns a pointer to a run of uniformly formatted text in the line format buffer. FIG. 8 shows this step 164 as the first step of the process. From the current run of characters, the format lexer 90 identifies the starting position and length of the format property change in terms of both the document and the line format buffer, the rule-base node index, and the value of the format property. The format lexer 90 stores this information in the format token cache 92 as shown in steps 166, 168. The format lexer 90 places format tokens in the format token cache for the run of text currently being processed in order of increasing character position. The format lexer sorts the format tokens according to increasing character position so that they correspond properly to the order in which they reside in the document, and then replaces the format token cache when it processes the next run of characters.

Referring again to FIG. 5, the token event generator calls the event engine for each token event interval. For each token defining a token interval event, the token event generator proceeds according to steps 126 and 128. When the lexer returns token incomplete, decision step 124 branches to step 130.

The token generator calls the scheduling routine in the event engine to schedule text and format tokens as shown in step 126. The token generator passes a direct token, and any cached indirect tokens and related format tokens to the event engine 52 for scheduling. The lexer passes cached indirect tokens along with the token defining an event interval.

For each text token defining a token interval, the token generator calls the evaluate routine in the event engine as shown in step 128. The event engine then evaluates all of the events and rules for the token interval section in the rule-base.

Figure 9A:
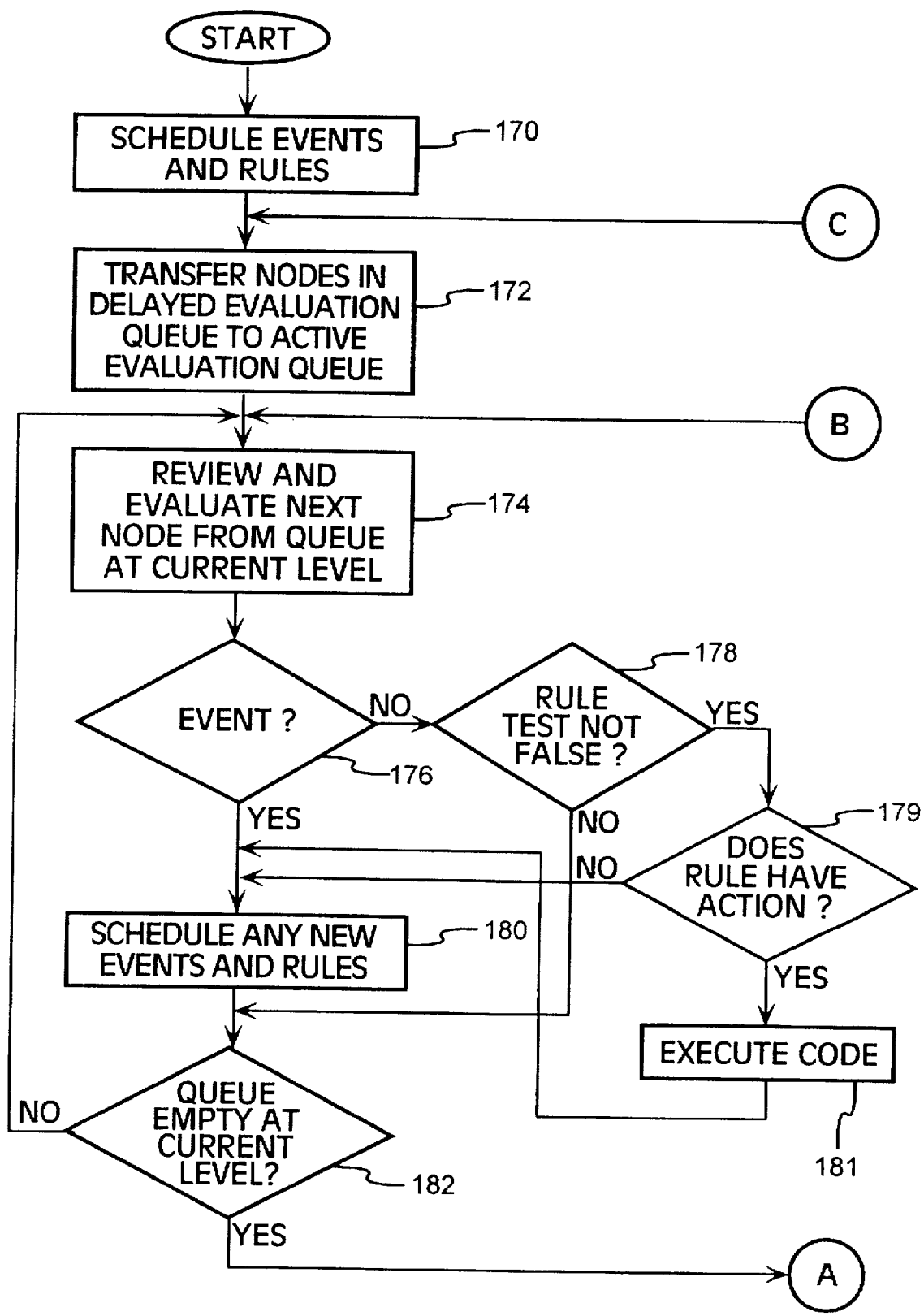
FIGS. 9A and 9B are a flow diagram illustrating the steps performed by the rule-based event engine in propagating an event through a rule-base.
Figure 9B:
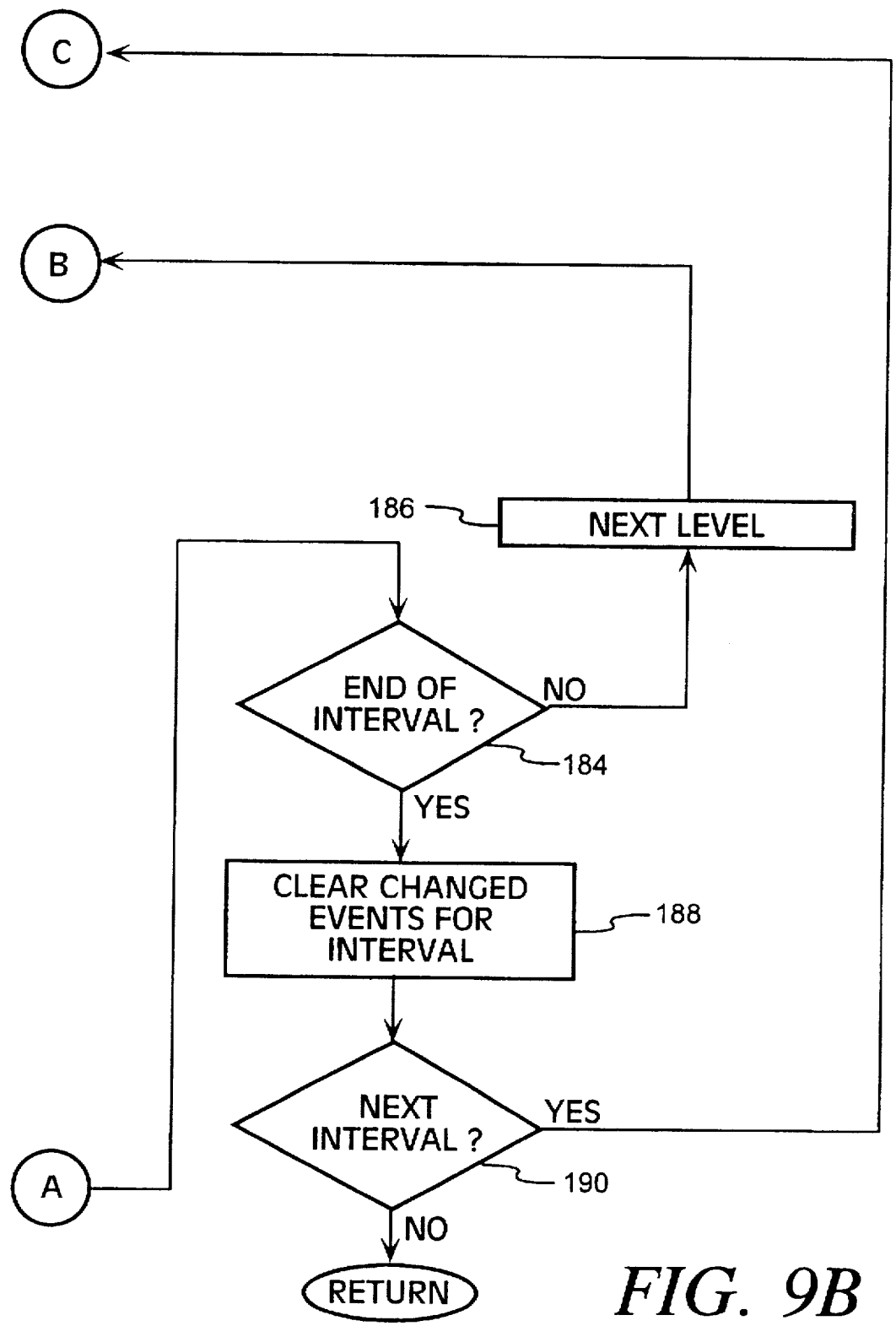

FIGS. 9A and 9B are flow diagrams illustrating how the event engine 52 processes events passed from the event generator 82. The text and format tokens passed to the event engine 52 include indices to nodes in the rule-base 58. The rule-base 58 comprises a single dimensional array, and each index corresponds to a cell in the array.

In addition, each cell in the array refers to one of two arrays of dependents lists: either the core dependents list or the body dependents list. The node refers to one of these lists based on the phase of the interactive autoformatter. Only one list is active at a time. The body dependents lists apply as the user types. The core dependents lists apply during an initialization phase and while the user types. The body dependents lists include all of the entries in the core lists for the nodes, plus additional entries. Initialization is a process for resetting the interactive autoformatter when the user moves the insertion point. The scanning performed during initialization is described further below.

Each node has two dependents lists. Each node in the rule-base has corresponding cells in each of the dependents list arrays. The cell in the active dependents list array, which has the same index as the node in the node array, is the active dependents list for that node.

A node is a data structure representing either a rule or event. The data structure is a 22 byte quantity including a variety of information relevant to the node. The data structure includes the level number corresponding to the interval section in the rule-base. It also specifies the node type: either rule or event. It includes a delay mask to indicate whether the node is scheduled for delayed evaluation. This delay mask helps implement the delay associated with a sequence rule.

The data structure further includes a pointer to the next item in the linked list when the node resides in an evaluation queue. If the value is null, then the event engine knows that the node is not queued in any evaluation queue.

For event nodes, the data structure includes a pointer to the next event variable in a linked list of event variables to be automatically cleared after evaluation of an interval. After evaluating all rules and events for an interval section, the evaluate routine clears the value of the event variables in this "auto-clear" list. By using a linked list, the event engine can determine whether the node is in the auto-clear list. The structure for both nodes and rules is generally the same, except rules do not require the pointer to the auto-clear list.

The nodes have an associated linked list, called a dependents list, listing the rules and nodes dependent on the rule or event associated with the node. As stated above, this list is found by indexing the nodes' index into the active dependents list array. The two types of dependents list arrays, core and body, are implemented as two arrays of dependents lists. During the initialization phase, the core dependents list array is active. While the user types, the body dependents list array is active. In this embodiment, the body dependents list incorporates the core dependents list.

When the event generator calls the scheduling routine and passes it tokens, the scheduling routine schedules all of the events and rules in the active dependents list for the nodes identified by the tokens as shown in the first step 170 of FIG. 9A. To schedule rules and events, the event engine 52 pushes a pointer to each of the events and rules nodes in the dependents list onto an evaluation queue at the level of the node in the rule-base.

There are two separate evaluation queues for each level in the rule-base. Referring again to FIG. 3, each node is associated with a level in the rule-base. Each level has an active evaluation queue and a delayed evaluation queue. Nodes scheduled on the active evaluation queue are evaluated immediately. Nodes scheduled on the delayed evaluation queue, however, are delayed for a specified number of event intervals.

The delayed evaluation queue supports the delayed evaluation of events and sequence rules. To support this delay, each node has a delay mask to indicate in which event interval(s) the node is to be evaluated. The delay mask shifts right one bit as the event generator 82 passes a new event at the interval associated with the node. When the first bit in the mask is on, and the shift removes it, the event engine transfers the node to the active queue for the node's level. For example, if a sequence rule is scheduled for two intervals of delay in the token interval section, the sequence rule will not be evaluated until two token interval events are passed to the event engine 52. The delayed evaluation queue, therefore, enables the conditions for an autoformat to be written terms of a sequence of events.

Referring again to FIGS. 9A and 9B, steps 172–190 refer to the evaluate routine in the event engine. Once scheduling is complete, the event generator calls the evaluate routine for on its interval section. The evaluation routine begins with step 172 by transferring nodes in the delayed evaluation queue to an active queue.

The evaluate routine then removes the next node from the queue and evaluates it as shown in step 174. If the node is an event (176), then the evaluate routine calls the scheduling routine to schedule the rules and events in the dependents list of the node as shown in step 180. If the node is a rule, then the rule must test "not false" before scheduling the entries in the dependents list as reflected in decision step 178.

If the rule does test "not false", the logic proceeds to decision step 179. If a rule has an action associated with it, this action is then executed as illustrated in step 181. An "action" as used here refers to code associated with the rule that executes when the rule is satisfied. The code can perform a variety of functions, but of particular importance is the function of generating delayed actions. Actions can cause delayed actions to be placed on the delayed action queue. Another type of action is the scheduling of new rules and/or events, and this step is illustrated in step 180.

In decision step 182, the evaluate routine checks to see if the evaluation queue is empty at the current level. If it is not, then the routine loops back to step 174. If it is, then the routine continues at decision step 184. During the first iteration, the "current" level is the first level of the interval section. For example, if the event generator passes an event in the token interval section, the event engine begins evaluation at the first level 100 in the token interval section. In the example rule-base illustrated in FIG. 3, the first level 100 is at the bottom of the token interval section.

As reflected in decision step 184, the evaluate routine continues to evaluate nodes in the evaluation queue for each level until the end of an interval section. After the last node is evaluated at the current level, the evaluation routine proceeds to the next level in the interval section as shown in step 186.

At the end of the interval section, the evaluate routine clears all changed events for that interval as shown in step 188. As described above, each node representing an event has a pointer to the next node in the auto-clear list. If the node has not changed value, it is not in this list, and the pointer points to null. If this pointer is not null, then the value of the event variable is cleared.

In some instances, the evaluate routine will transition to another interval section and repeat the evaluation process for that interval section. To implement this type of a transition, an event interval includes a transition rule. If the condition (s) for a transition rule is(are) satisfied, the transition rule sets the value of the transition variable to a number corresponding to the interval section that it transitions to. In decision step 190, the evaluate routine checks the value of the transition variable. If the transition variable is set to another interval section, the evaluation routine loops back to step 172. Otherwise, the evaluation routine is finished.

During the evaluation process, the event engine can generate autoformat actions called "delayed actions" 106. This aspect of the system is illustrated in FIG. 2 by the arrow leading from the rule-base 58 to the delayed action queue 108. If an action rule is satisfied, the event engine 52 will place a delayed action in the delayed action queue 108.

The delayed action queue 108 is a linked list of delayed action records. A delayed action record includes a number of fields. One field specifies an edit range, if any. The edit range is represented by the starting and ending character position in the document. It can be registered for automatic adjustment. This adjustment is critical where one action affects another. For example in carrying out in action, an edit routine can add characters to the document, changing the position of existing characters. If another delayed action is registered for adjustment, the edit range associated with it can be adjusted where necessary to ensure that the edit range corresponds to the proper characters. This also permits rules to make editing decisions without having to adjust for the affects of changes of other rules. Not all actions include an edit range, however. For actions that do not edit the document, there is no need for an edit range.

Another field in the delayed action record specifies the action record type or "opcode." This opcode can be used to describe a class of actions having similar behavior.

Yet another field contains a next pointer to the next action in the queue. If the next pointer points to null, it is the last record in the queue.

A composite action includes a pointer to a sublist of actions. This sublist specifies the actions to be carried out when the composite action is performed.

Any delayed actions in the delayed action queue 108 are performed after the evaluate routine illustrated in FIGS. 9A and 9B returns. Referring again to FIG. 5, the token event generator determines whether there are any delayed actions in the delayed action queue as reflected in decision step 130. If there are, the token event generator calls the delayed action interpreter 94 to perform the action or actions in the delayed action queue.

The delayed action interpreter 94 portion of the event monitor 50 is responsible for initiating functions 95 to carry out these delayed actions. The delayed action interpreter 94 calls the appropriate routine to carry out a delayed action. It also sets up the "undo" stack. The undo stack enables the user to undo the last action or composite action that has been carried out. For example, if an autoformat rule converts a list into a auto-bulleted list, the user can undo it by selecting the undo command from the edit menu. Even a composite action appears as one entry on the undo stack. This enables the user to undo each of the actions in the composite action by simply selecting the undo command once.

The delayed action interpreter performs the actions one at a time until no more actions remain in the queue. For composite actions, the delayed action interpreter iterates, running each action in the sublist until no more actions remain. It then continues with the next action in the queue. When the delayed action queue is empty, the event generator is finished until another event occurs.

The preceding discussion describes how the system formats a document while the user types. Because the user can often change the insertion point of the cursor, the system must detect this form of user input and reset the autoformatter appropriately.

When a user moves the insertion point and starts typing, the system initializes itself. The initialization process begins by moving to a position in the document before the insertion point, and scanning for tokens from this position to the insertion point. The scan starts at five characters in front of the end of the previous paragraph and continues to the insertion point. For optimization, only the first line and the line(s) located 256 characters before the insertion point through the current line of the paragraph where the cursor is located are scanned.

The autoformatter behaves in a batch mode during initialization. The initialization routine begins its scan by loading the line format buffer starting 5 characters before the start of the current paragraph. The lexer then analyzes tokens as set forth above. For each token interval, the initialization routine calls the evaluate routine.

The initialization scan differs from the interactive mode in a few key respects. During this initialization phase, the core dependents lists apply instead of the body dependents lists. Also, delayed actions are not produced. The purpose of initialization is to reset the system. By starting 5 characters before the end of the previous paragraph, the system can detect patterns of events leading up to the insertion point. The specific range of characters scanned can vary. In this case, the range was chosen to identify how the previous paragraph ended, or alternatively, to identify whether a previous paragraph existed.

In addition to supporting automatic formatting, the rule-based event engine supports a variety of other word processing features. Because the event engine supports efficient rule analysis for a wide variety of user input events, it can be adapted to support other automated word processing features that depend on user input events. One feature is a tip wizard, which detects what the user is doing and gives helpful feedback. Another feature is automatic correction or "auto-correction." Automatic correction refers to watching for typical errors and correcting them as they occur. An important capability of the event engine can enhance auto-correction. The event engine can be used to create exceptions to the auto-correct rules by watching whether the user reverses an auto-correct action.

The system illustrated in FIG. 2 supports the tip wizard. A tip is helpful text displayed in a box on the display screen. A tip can simply provide helpful text to give the user feedback. In addition to displaying text, the tip can also give the user an option to select an action. This system displays a push button control in the tip box to prompt for user input. This push button enables the user to cause an action to be carried out, or undo an action that the system has performed automatically. For example, a tip box with a push button control can be displayed as part of a composite delayed action. While in autoformat mode, composite delayed actions that edit the document can display a tip box and push button control to enable the user to undo the edit actions. Conversely, when autoformat mode is not selected, the edit action can be made dependent on whether the user selects the "do it" push button in the tip box, which includes text describing the potential edit action.

To support the tip wizard actions, one can write rules to define the user input events that trigger the action and to define the action as well. These rules are then compiled into the rule-base 58 with the rule compiler. The composite rules that support tips are generally written in terms of user interface or dialog events. For example, the system can detect whether the user is floundering by watching for patterns of events such as opening a dialog and then closing it more than once without selecting any option. While the tip wizard rules generally are written in terms of user interface and dialog events, they can also be written in terms of other events as well, including token and character events.

The system illustrated in FIG. 2 also supports auto-correction. Auto-correction refers to detecting common typing errors, and automatically making a correction. For example, auto-correct features include capitalizing first words in sentences, or changing the second capital letter in a sequence of two capital letters to an un-capitalized state. The first feature addresses a common mistake of not capitalizing the first letter of the first word in a sentence. The second addresses the problem where users accidentally hold the shift key too long when capitalizing a first letter of a word.

One can write composite auto-correct rules to support auto-correct features as well as exceptions to the features. One class of exceptions to the first word capitalization rule is when the user types an abbreviation followed by a period, and then another word that is not the beginning of a sentence. For example, "etc." is commonly used in the middle of a sentence. The rule or rules implementing this feature can include an exception list identifying some exceptions where the rule is not to be applied. In effect, the exception is a rule that interferes with the auto-correct rule.

There are limits to the number of exceptions that can be pre-defined in the rule-base. As such, the system supports creating exceptions interactively, i.e. adding exceptions based on user behavior.

The composite rule includes an action rule specifying the delayed action(s) necessary to carry out an auto-correct rule. When the action rule is satisfied, it generates a delayed action similar to the delayed actions described above in the context of autoformatting actions. Specifically, it generates an action to edit the text according to the auto-correct rule. As with autoformat actions, an auto-correct action need not edit the document, but in most cases it will involve an edit.

To watch for exceptions, the action rule also generates additional actions. The first word capitalization example will help illustrate the concept. Assume the user abbreviates "after" as "aft." in typing the phrase, "aft. five". The period at the end of word, followed by a space, triggers the auto-correct rule to capitalize "five". When the action rule in the rule-base tests "not false," a composite action is placed in the delayed action queue.

The composite action includes three primary actions, each which can include one or more actions. One action capitalizes the first letter. Another captures the previous word "aft," and the word, "five". And the third invokes a watch routine.

The watch routine is designed to detect when the user backspaces over or otherwise edits the autocorrection and replaces it with the original text. As an argument to the watch routine, the delayed action interpreter passes the ID of a function to perform a compare between the second word, "five", and any modification of this word. The result of the compare indicates whether the user is replacing the auto-correction with the original text.

For any attempt to modify the word, "five", the watch routine calls the compare function. If the compare results in a match, the compare function adds the word "aft" to the exception list. In this embodiment, the compare function is implemented as a rule because it is the same rule used in connection when the user invokes the undo command. However, it can also be implemented as a separate function. If the user selected the undo command rather than retyping to "undo" the autocorrection, the compare rule is triggered to add the exception to the exception list.

In this embodiment, there are a number of ways to dynamically alter the rule-base to support autocorrect features. The autocorrect features include 1) the capability to automatically detect a character string and replace with another character string; 2) automatic capitalization of the first letter in a sentence; and 3) automatic de-capitalization of a second letter in a word. For the first feature, the program has a number of predefined character strings to watch for and replace, which are listed as entries in an "autocorrect list." To change the autocorrect list provided with the program, the user can add or delete entries from the list by using the autocorrect dialog. The second and third features are, in effect, special cases of the first feature. There are a number of exceptions to the second and third features, which are listed in an exceptions list for each feature. The user can change entries in the exception lists using the autocorrect dialogs. In this embodiment, the dialog boxes dealing with the special cases are accessible from within the autocorrect dialog. In addition to modifying the exception list through the dialog box, the program can generate additional exceptions when the user selects the "undo" button or manually reverses the special case features as described above.

The aspects of the program relating to the autocorrect list and exception lists are discussed in more detail below.

In this embodiment, there are three instances where the rule-base can be modified according to changes in the autocorrect list and the exception list. One is at boot time when the program scans the autocorrect and exception lists from files and modifies the rule-base as necessitated by the entries in the lists. The next instance is from user changes entered through the autocorrect dialog. And the third is when the user selects the "undo" option or manually reverses one of the autocorrect special cases. At boot time, the program scans each entry in the autocorrect and exception lists to identify whether the rule-base has to be modified according to entries in these lists. For changes entered in the autocorrect dialog, the program scans characters provided in an edit box inside the dialog box. When the user reverses one of the special cases, the character string associated with the exception is captured as described above in connection with the composite actions for the first letter capitalization feature.

It is not critical where the character string is specifically located when the scanning is performed. In this embodiment, the lexer performs the scanning when given a pointer to the location of a string to scan. As such, the lexer operates similarly regardless of where the character string is located. However, the dispatch routine used to specifically identify tokens can be designed to operate differently depending on where the character string is scanned from. For example, if the character string comes from an edit box as opposed to a document, then there is no need to look for certain events that occur only in a document such as paragraph and line marks.

The scanning of a character string generally involves calling the lexer for a specified character string. In some cases, the scan of a character string can include generating a sequence of tokens. However, in many cases, the character string only constitutes a single word, having a single corresponding token. In the case of a sequence of tokens, the program takes the last token in the sequence and looks it up in the look-up table to determine whether an event node corresponding to the token already exists. In the case of a single token, it simply looks up this token rather than taking the last token in the sequence.

If the token event is in the table, i.e. already exists, the rule-base already has an associated event node. In this case, the event node is simply linked with another event node. The type of event node that it is linked to depends on whether the scan is performed for an autocorrect entry or for an exception to one of the special cases.

For an autocorrect entry, the event node is linked to another event node that triggers the autocorrect rule. This event node is referred to as an "autocorrect" event. As an alternative, the event node corresponding to an autocorrect entry can be directly linked the autocorrect rule. In this alternative, the event node corresponding to the autocorrect entry is also an autocorrect event.

For an exception to an autocorrect feature, the event node is linked to another event node that inhibits that feature. For example, the autocorrect action(s) for first letter capitalization are not carried out if this inhibiting event is set to true.

In some cases, such as when a new entry is added to the autocorrect list, a corresponding event node for the new entry may not exist. If the token event is not in the table, then an event node has to be added to the rule-base. When an event node is added, the associated token is also added to the look up table for the lexer. As described above, the look up table associates a token event with an index to its node in the rule-base. For new entries to either the autocorrect or exception lists, the appropriate list is updated to include the new entry.

After a new node is created, a linkage can then be established with other nodes. To create a link, an entry is added to the dependents list of the new event node. Conversely when the user removes an autocorrect entry from the autocorrect list, the linkage between the event node and the autocorrect rule is removed. In this embodiment, the linkage between an event node for an autocorrect entry and the event node that triggers the autocorrect rule is removed.

In a typical case, the autocorrect rule operates as follows. When an event node that is linked to the autocorrect rule is evaluated, it triggers the autocorrect rule. The autocorrect rule then calls a compare routine, which compares one or more tokens in the text token cache with the autocorrect entry to determine whether there is a match. In the case of a sequence of tokens, the autocorrect rule triggers after detection of the last token in the sequence. Walking backwards through the sequence, the compare routine then checks to see if the tokens in the text token cache match with the sequence in the autocorrect entry. If there is a match, then the document is edited as appropriate to replace the existing character string with its replacement in the autocorrect list.

Using this approach, a number of autocorrect entries, and exceptions to the autocorrect entries can easily be added to or removed from the rule-base. The event engine and rule-base provide efficient support for autocorrect features because rules supporting the features can be designed to trigger only after certain events are generated.

While a system and method for interactively formatting a document is described in detail, it should be understood that the invention can be modified without departing from the scope of the invention. For example, the routines for implementing the event engine and event monitor can be modified without departing from the scope of the invention. The specific implementation of the rule-base, including the data structures used to implement it, can also vary. The rules can be structured to depend on a variety of events, which can vary depending on the computer platform, the application program, as well as other factors. The rule-base is flexible in that it supports a variety of different event types, event intervals, and associated interval sections. Rules can be implemented with delay by scheduling dependent events or rules in other intervals. In short, a number of variations are possible.

In view of the many possible embodiments to which the principles of my invention may be put, it is emphasized that the detailed embodiment described herein is illustrative only and should not be taken as limiting the scope of my invention. Rather, I claim as my invention all such embodiments as may come within the scope and spirit of the following claims and equivalents thereto.

I claim:

1. A method for interactively formatting a word processing document in a word processing system, the method comprising the following steps:

storing interdependent rules and predefined events in a rule-base;

as a user enters characters into a word processing document, scanning the characters from the word processing document;

analyzing the characters to identify one or more predefined events;

scheduling the one or more predefined events for evaluation on an evaluation queue;

evaluating the one or more predefined events by scheduling rules or other predefined events that are dependent on the one or more predefined events;

evaluating one or more rules including an autoformat action rule; and if the conditions of the action rule are satisfied, automatically formatting the word processing document according to an autoformat action while the user enters characters into the word processing document.

2. The method of claim 1 wherein the predefined events include tokens for contiguous strings of the characters.

3. The method of claim 1 wherein the predefined events include character events.

4. The method of claim 1 wherein the scanning step includes intercepting a character each time the user types a character.

5. The method of claim 2 wherein the analyzing step includes determining whether a contiguous string of characters constitutes a token by detecting a transition from a first type of character to a second type of character, and if the transition is detected, then finding a token corresponding to the contiguous string of characters.

6. The method of claim 1 wherein the interdependent rules and predefined events are sorted into interval sections in the rule-base, the method further including:

scheduling a rule in a dependents list of a first predefined event when the first predefined is identified;

evaluating the rule to determine whether a condition of the rule is satisfied in response to detecting an event interval for an interval section in the rule-base which includes the rule;

and in response to evaluating the rule, scheduling another rule or predefined event that depends on the rule.

7. A method for automatically formatting a word processing document comprising:

storing event-based rules in a rule-base having predefined event interval sections;

intercepting user input events as entered into a word processing document;

analyzing the user input events to determine whether the user input events corresponds to predefined events;

if a predefined event is detected, then scheduling dependent event-based rules or other predefined events;

evaluating the dependent event-based rules or other predefined events in an event interval section when a predefined event interval corresponding to the event interval section is detected; and in response to evaluating a event-based autoformat action rule, performing an autoformat action.

8. The method of claim 7 further including:

sorting the event-based rules and predefined events into the rule-base, wherein the rule-base comprises interdependent nodes with links representing interdependence of event-based rules and predefined events.

9. The method of claim 7 wherein an event-based rule is associated with a dependents list of predefined events and other event-based rules; and wherein evaluating the event-based rule includes scheduling the predefined events and other event-based rules in the dependents list if the event-based rule is satisfied.

10. The method of claim 7 wherein the rule-base includes a predefined event, which is associated with a dependents list of other predefined events or event-based rules;

and wherein evaluating the predefined event includes scheduling the other predefined events or event-based rules in the dependents list.

11. The method of claim 7 wherein the rule-base includes an array of event-based rules and predefined events; and at least one event-based rule in the array includes a dependents list having another event-based rule and a predefined event, and at least one predefined event in the array includes a dependents list having another predefined event and an event-based rule.

12. The method of claim 7 wherein the performing step includes performing delayed actions associated with the autoformat action rule.

13. A method for interactively formatting a word processing document in a word processor system including a programmed computer, a display device, and an input device, the method comprising the steps of:

(a) intercepting user input events received from the input device as a user enters input events while preparing a word processing document;

(b) analyzing the user input events as the user enters the input events to determine whether the user input events correspond to predefined events, where the predefined events are arguments to expressions of autoformat rules, and the expressions are conditions that need to be satisfied for the autoformat rules to generate autoformat actions;

(c) scheduling a rule for evaluation by placing that rule on an evaluation queue in response to detecting that the at least one predefined event has occurred and is an argument to the rule;

(d) as the user enters the input events, evaluating an autoformat rule in response to detecting that at least one of the predefined events has occurred; and (e) in response to evaluating the rule, performing an autoformat action corresponding to the rule automatically as the user enters the input events while preparing the word processing document.

14. A method for interactively formatting a word processing document in a word processor system including a programmed computer, a display device, and an input device, the method comprising the steps of:

(a) intercepting user input events received from the input device as a user enters input events while preparing a word processing document;

(b) analyzing the user input events as the user enters the input events to determine whether the user input events correspond to predefined events, where the predefined events are arguments to expressions of autoformat rules, and the expressions are conditions that need to be satisfied for the autoformat rules to generate autoformat actions;

(c) scheduling rules for evaluation that depend on the at least one predefined event in response to detecting that the at least one predefined event has occurred;

(d) as the user enters the input events, evaluating the rules that depend on the at least on predefined event in response to detecting that at least one of the predefined events has occurred;

(e) in response to evaluating the rules, scheduling additional rules; and (f) in response to evaluating the rule, performing an autoformat action corresponding to the rule automatically as the user enters the input events while preparing the word processing document.

15. A method for interactively formatting a word processing document in a word processor system including a programmed computer, a display device, and an input device, the method comprising the steps of:

(a) intercepting user input events received from the input device as a user enters input events while preparing a word processing document;

(b) analyzing the user input events as the user enters the input events to determine whether the user input events correspond to predefined events, where the predefined events are arguments to expressions of autoformat rules, and the expressions are conditions that need to be satisfied for the autoformat rules to generate autoformat actions;

(c) scheduling an action rule for evaluation that depends on the at least one predefined event in response to detecting that the at least one predefined event has occurred;

(d) as the user enters the input events, evaluating the rules that depend on the at least on predefined event in response to detecting that at least one of the predefined events has occurred;

(e) in response to evaluating the action rule, placing a delayed action in a delayed action queue;

(f) in response to evaluating the rule, performing an autoformat action corresponding to the rule automatically as the user enters the input events while preparing the word processing document; and (g) performing the delayed action to carry out the autoformat action.

16. A method for interactively formatting a word processing document in a word processor system including a programmed computer, a display device, and an input device, the method comprising the steps of:

(a) storing rules in pre-defined event interval sections in a rule-base;

(b) intercepting user input events received from the input device as a user enters input events while preparing a word processing document;

(c) analyzing the user input events as the user enters the input events to determine whether the user input events correspond to predefined events, where the predefined events are arguments to expressions of autoformat rules, and the expressions are conditions that need to be satisfied for the autoformat rules to generate autoformat actions;

(d) scheduling rules for evaluation that depend on a first predefined event in response to detecting that the first predefined event has occurred;

(e) as the user enters the input events, evaluating an autoformat rule in response to detecting that at least one of the predefined events has occurred;

(f) evaluating rules in a first pre-defined event interval section in response to detecting that an event interval has occurred for the first pre-defined event interval section; and (g) in response to evaluating the rule, performing an autoformat action corresponding to the rule automatically as the user enters the input events while preparing the word processing document.

* * * * *

UNITED STATES PATENT AND TRADEMARK OFFICE
CERTIFICATE OF CORRECTION

PATENT NO. : 5,778,402

DATED : July 7, 1998

INVENTOR(S) : Dale R. Gipson

It is certified that error appears in the above-identified patent and that said Letters Patent is hereby corrected as shown below:

In the Specification:

Column 3, line 61, "of a" should read --of--.

Column 9, line 62, "a event" should read --event--.

Column 12, line 5, "not confuse" should read --not to confuse--.

Column 18, line 19, "a auto-bulleted" should read --an auto-bulleted--.

Column 21, line 45, "linked the" should read --linked to the--.

In the Claims:

Claim 7, line 42, "a event based" should read --an event based--.

Claim 14, line 48, "least on" should read --least one--.

```
claim 15, line 10, "least on" should read
-- least one --
```

Signed and Sealed this

Second Day of May, 2000

Attest:

Q. TODD DICKINSON

*Attesting Officer*  *Director of Patents and Trademarks*